US009565969B2

(12) United States Patent
Capraro et al.

(10) Patent No.: US 9,565,969 B2
(45) Date of Patent: Feb. 14, 2017

(54) SECTION BAR FOR A HEATER AND FLUID FLOW HEATER, IN PARTICULAR FOR COFFEE MACHINES

(71) Applicant: I.R.C.A. S.P.A. INDUSTRIA RESISTENZE CORAZZATE E AFFINI, San Vendemiano (IT)

(72) Inventors: Duilio Capraro, Conegliano Veneto (IT); Vania Foltran, Cordignano (IT); Federico Zoppas, Treviso (IT)

(73) Assignee: I.R.C.A. S.P.A. INDUSTRIA RESISTENZE CORAZZATE E AFFINI, San Vendemiano (IT)

( * ) Notice: Subject to any disclaimer, the term of this patent is extended or adjusted under 35 U.S.C. 154(b) by 0 days.

(21) Appl. No.: 14/347,122

(22) PCT Filed: Sep. 28, 2012

(86) PCT No.: PCT/IB2012/055194
§ 371 (c)(1),
(2) Date: Mar. 25, 2014

(87) PCT Pub. No.: WO2013/046171
PCT Pub. Date: Apr. 4, 2013

(65) Prior Publication Data
US 2014/0233931 A1    Aug. 21, 2014

(30) Foreign Application Priority Data

Sep. 29, 2011    (IT) .............................. RM2011A0514

(51) Int. Cl.
F24H 1/10    (2006.01)
A47J 31/54    (2006.01)
(Continued)

(52) U.S. Cl.
CPC ............. *A47J 31/542* (2013.01); *F24H 1/102* (2013.01); *H01C 17/02* (2013.01); *H01C 17/04* (2013.01);
(Continued)

(58) Field of Classification Search
None
See application file for complete search history.

(56) References Cited

FOREIGN PATENT DOCUMENTS

DE    2340489    2/1975
DE    7821809    10/1978
(Continued)

OTHER PUBLICATIONS

International Search Report and Written Opinion dated Dec. 14, 2012 for corresponding international patent application No. PCT/IB2012/055194.

*Primary Examiner* — Thor Campbell
(74) *Attorney, Agent, or Firm* — Abelman, Frayne & Schwab

(57) ABSTRACT

The section bar (1) for a fluid flow heater for coffee machines has a longitudinal development with two opposing ends and a first tubular cavity (A), that is accessible at the opposing ends of the section bar (1), and a second cavity (B) having an opening (O) that extends along the longitudinal development of the section bar (1). A heater (10) having an encased resistor (2, 3) integrated in the first cavity (A) of the section bar (1) and a tubular fluid circulation conduit (4) inserted into the second cavity (B) of the section bar (1) and fixed by means of bending at least one lug (B1, B2, B3) around the tubular fluid circulation conduit (4), so that the opposing ends of the tubular fluid circulation conduit (4) emerge with respect to the opposing ends of the section bar (1).

17 Claims, 3 Drawing Sheets

(51) Int. Cl.
   *H05B 3/48* (2006.01)
   *H01C 17/02* (2006.01)
   *H01C 17/04* (2006.01)

(52) U.S. Cl.
   CPC ............ *H05B 3/48* (2013.01); *Y10T 29/49083* (2015.01); *Y10T 29/49096* (2015.01)

(56) References Cited

FOREIGN PATENT DOCUMENTS

| | | |
|---|---|---|
| DE | 2942523 | 4/1981 |
| EP | 0881859 | 12/1998 |
| FR | 2447772 | 8/1980 |

SECTION BAR FOR A HEATER AND FLUID FLOW HEATER, IN PARTICULAR FOR COFFEE MACHINES

CROSS-REFERENCE TO RELATED APPLICATIONS

This application is a National Phase of PCT/IB2012/055194, filed 28 Sep. 2012, which claims priority from Italian Application No. RM2011A000514, filed 29 Sep. 2011, the disclosures of which are all incorporated herein by reference.

FIELD OF THE INVENTION

The present invention relates to a section bar for a heater and a fluid flow heater, in particular for coffee machines, and to a related manufacturing method.

BACKGROUND OF THE INVENTION

The heating of water in coffee machines is achieved by means of encased resistors, wherein the resistance wire is generally spiral-wound inside a casing. Furthermore, in flow heaters the encased resistor is also typically associated to a tubular duct in which water circulates, so that the respective axes of longitudinal development are parallel to each other.

The duct and the encased resistor thus associated can be arranged, for example spiral-wound, inside a coffee machine to limit the dimensions thereof and so that a tubular duct has the resistor placed side by side on two opposite sides, thus improving the heat exchange.

It is also requested that the heater take on extreme forms in terms of bending angles so that it may adapt to the shape of the domestic appliance.

For this reason the brazing procedure cannot be performed prior to the bending/winding of the resistor since it would be deteriorated by the subsequent bending/winding of the resistor.

On the other hand, it is requested that the amount of brazing material be minimized and the operation be simplified since said operation becomes complicated when the heater is already bent/wound in its final form. It is therefore fundamental to optimise the coupling between the encased resistor and the tubular fluid circulation duct.

WO2007/135519 describes a solution wherein one support element simultaneously defines the encased resistor and the tubular duct for the passage of the liquids. Said solution presents the disadvantage of having to subject the heater to costly cutting and turning operations at the ends since the ends of the fluid circulation ducts must emerge with respect to the terminals of the resistor and must be especially shaped/machined to allow suitable connections to be fitted to the hydraulic circuit of the domestic appliance or coffee machine. Thus, although this solution eliminates or reduces brazing of the resistor, it presents the disadvantage of complicating machining on the ends of the fluid circulation duct.

SUMMARY OF THE INVENTION

The aim of the present invention is that of providing a section bar for a fluid flow heater, in particular for coffee machines, which proposes to improve simplicity of construction and versatility of use in the production of fluid flow heaters.

One object of the present invention is a section bar for a fluid flow heater, in particular for coffee machines, which according to claim 1, has a longitudinal development of defined length that is greater than any dimension of a cross-section, with two opposite ends, and defines a first tubular cavity with openings in said opposite ends and a second cavity having an opening, that extends along the longitudinal development of the section bar, adapted to house a tubular duct by transverse insertion with respect to said longitudinal development.

Said section bar is shaped so as to produce the electric resistor within the closed cavity, but above all so as to have an open cavity for the housing and fastening of a tube for the passage of the water.

A further aim of the invention is that of providing a manufacturing method of a fluid flow heater, particularly suitable for use in coffee machines, which simplifies and reduces machining.

One object of the present invention is a manufacturing method for a fluid flow heater, particularly suitable for use in coffee machines, according to claim 9.

Another object of the present invention is a fluid flow heater, in particular for coffee machines, according to claim 13.

A further object of the present invention is a domestic appliance, and in particular a coffee machine, comprising the aforementioned heater.

Advantageously, thanks to the present invention an encased resistor integrated in a section bar and arranged to be associated to a tubular fluid circulation duct by means of a lateral insertion, i.e. in parallel to the longitudinal development of the section bar. In this way the ends of the tubular duct can be machined and prearranged prior to insertion in the section bar, thus significantly simplifying a first phase of the machining. In addition, according to the present invention, after insertion of the tubular duct, bending of at least one lug takes place. Said bending defines a groove that develops longitudinally according to the development of the section bar. In this way, the brazing operation of said groove is simplified since it is accessible irrespective of the shape, for example spiral shape, of the heater obtained.

The dependent claims describe preferred embodiments of the invention, forming an integral part of the present description.

BRIEF DESCRIPTION OF THE DRAWINGS

Further characteristics and advantages of the invention will become clearer in the light of the detailed description of preferred but non-exclusive embodiments of a section bar for a heater, in particular for coffee machines, illustrated by way of a non-limiting example, with the assistance of the accompanying drawings, wherein.

The same reference numbers and letters in the drawings identify the same elements or components.

DETAILED DESCRIPTION OF A PREFERRED EMBODIMENT OF THE INVENTION

Figure 1:
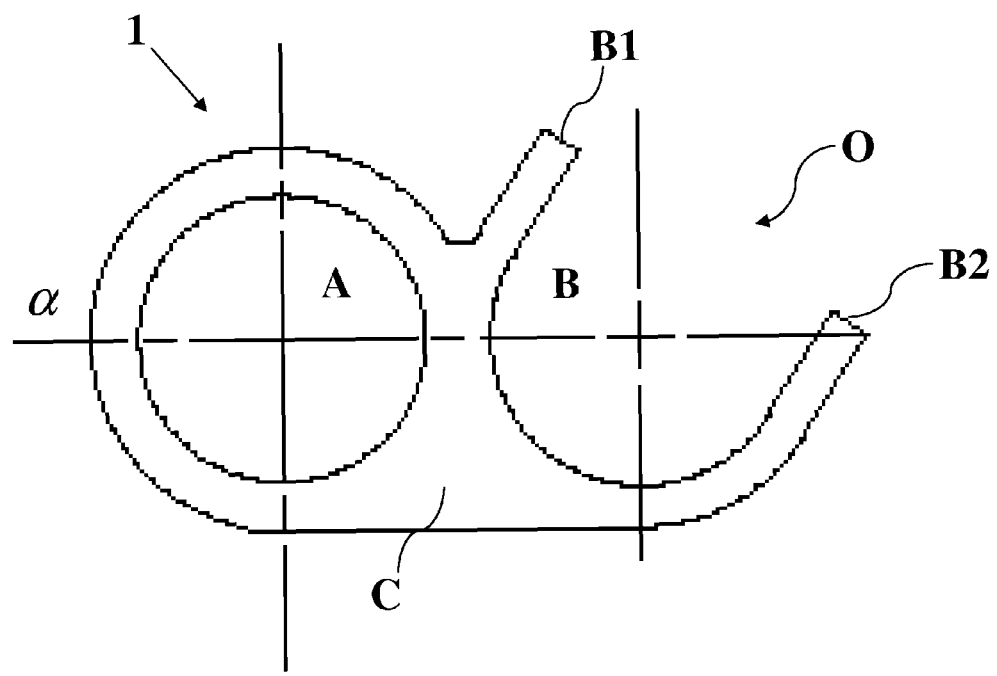
FIGS. 1, 2 and 3 represent variants of the section bar according to the present invention, wherein the second cavity comprises a pair of lugs that identify a direction of lateral insertion of the fluid circulation duct; said direction is respectively oblique, parallel and perpendicular with respect to an approaching plane of the cavities defining the section bar.

The drawings represent a cross section representative of the section bar 1, object of the present invention. Said section bar can be obtained for example by extrusion, taking on a longitudinal shape perpendicular to the drawings sheet. According to the cross sections of the drawings, section bar 1 comprises a closed cavity A, that is only accessible at the opposite ends of the section bar, and a second cavity B, that is open along the longitudinal development of the section bar. This second cavity B will also be referred to hereunder as longitudinal cavity. In other words, said open cavity is presented as a rectilinear groove that can be accessed and filled with brazing material at any point of the longitudinal development of the section bar.

The two cavities are integral to form a single body, i.e. enbloc.

The first cavity A is intended to define an encased resistor, i.e. intended to provide housing for a resistance wire 2, for example spiral wound, for an insulator, for example magnesium oxide 3, that isolates the resistance wire, as well as any safety devices, not shown, from the section bar 1.

The longitudinal cavity B is intended to house a tubular duct 4 of any nature, preferably made of steel or aluminium, through a lateral, pressure-in insertion, parallel to the longitudinal development of the section bar 1.

The cavity B being open along the entire length of the section bar 1, the association between the section bar 1 and the tubular conduit 4 is produced by placing the section bar 1 and the tubular conduit 4 side by side rather than by inserting the tubular conduit 4 in a coaxial direction to the longitudinal development of the section bar 1.

The closed cavity A preferably has a circular section, while the open cavity B has a substantially J- or U-shaped section, in relation to the respective presence of one lug or crest B3 or of two lugs or crests B1 and B2.

Figure 2:
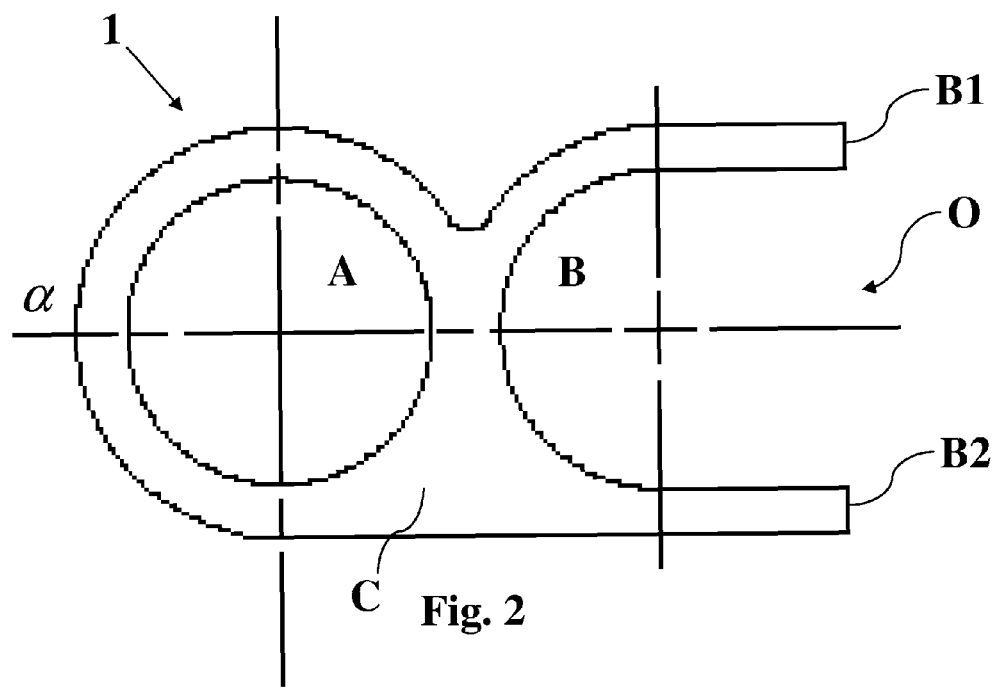
Figure 3:
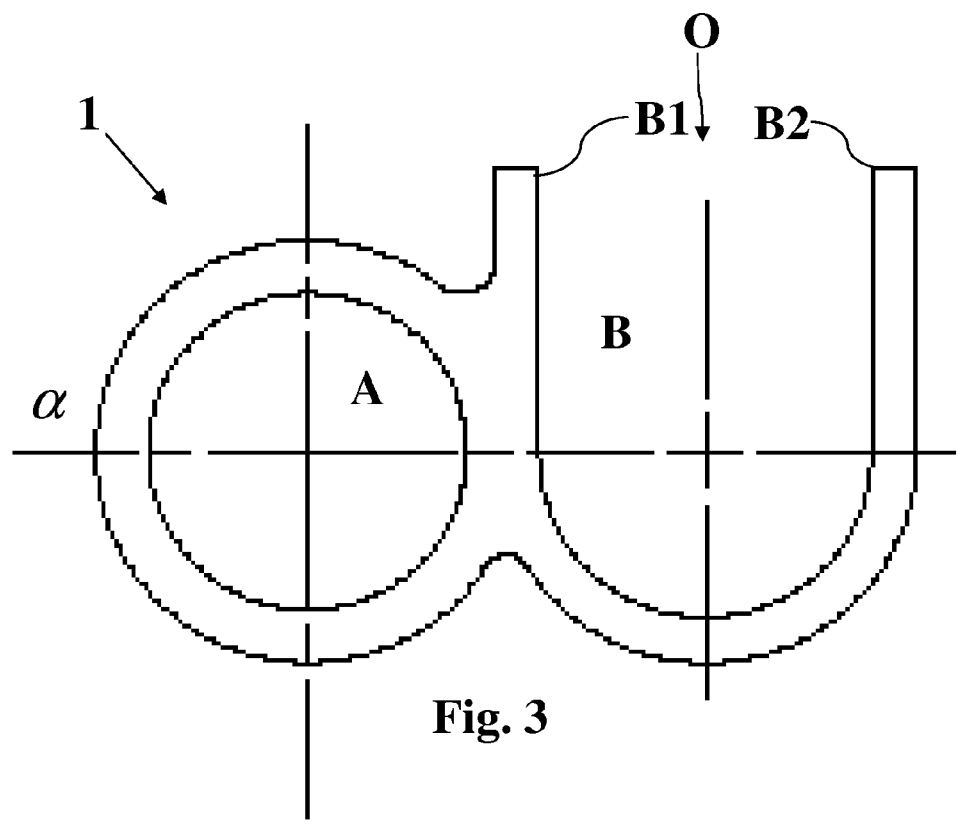

From comparison of the variants represented in the drawings it emerges that the direction of insertion of the tubular conduit is parallel and intermediate with respect to the lugs B1 and B2, lying on the drawings sheet, and can be perpendicular, see FIG. 3, parallel, see FIG. 2, or oblique, see FIG. 1, with respect to the approaching plane α of the cavities A and B. The approaching plane α substantially coincides with the lay plane of the two longitudinal axes of cavities A and B.

Figure 4:
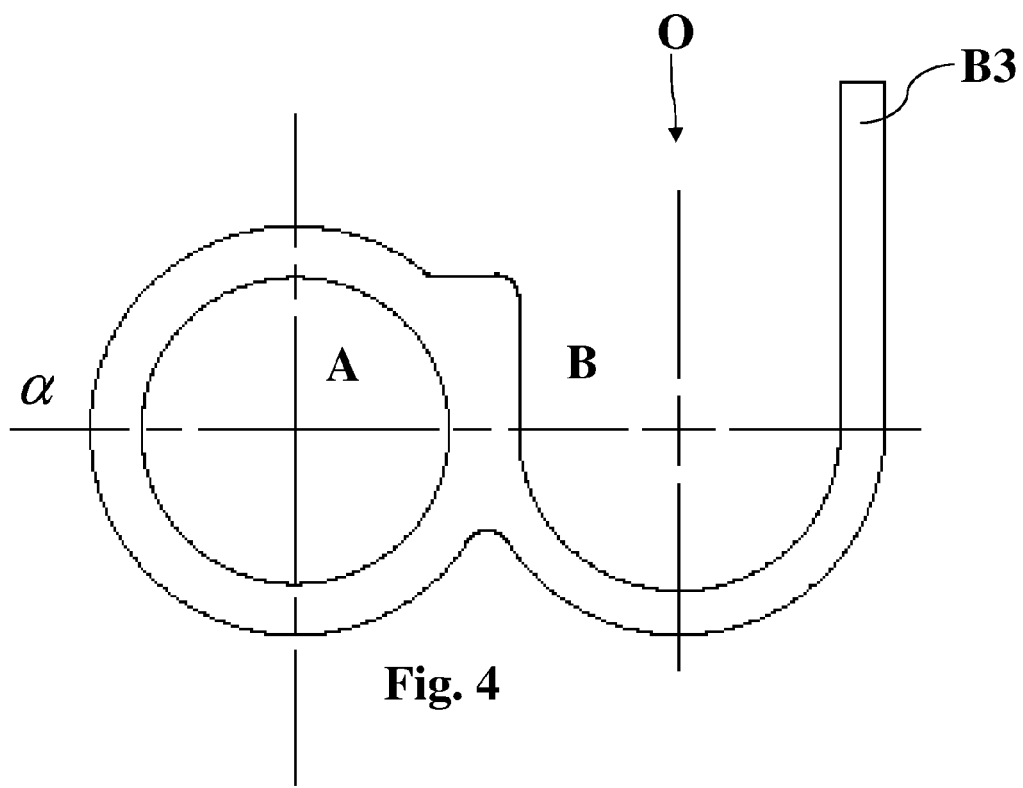
FIG. 4 represents a variant wherein said longitudinal opening comprises a single lug.
Figure 5:
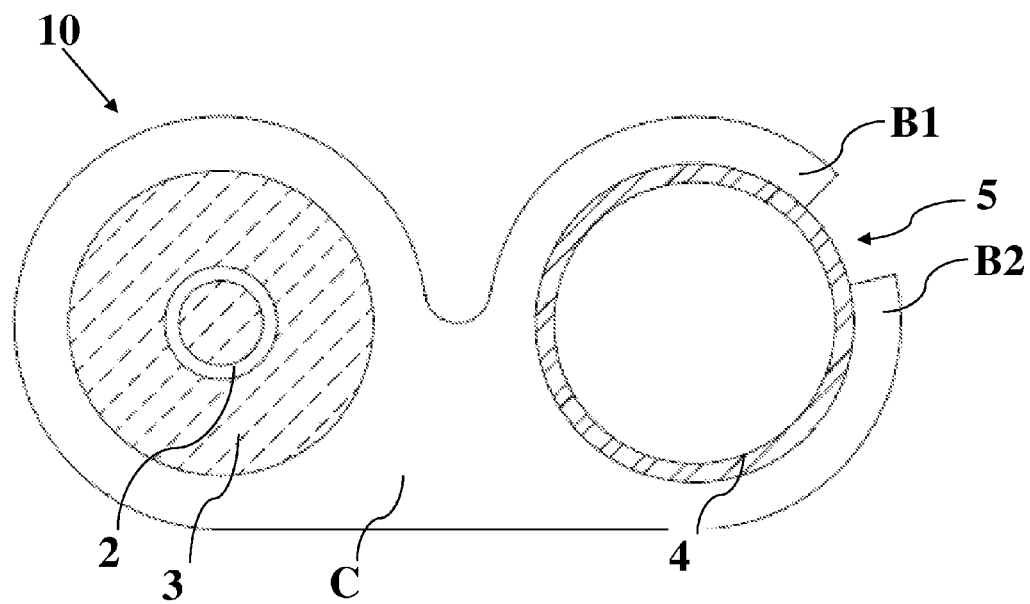
FIG. 5 shows a heater obtained by means of a section bar according to FIG. 1.
Figure 6:
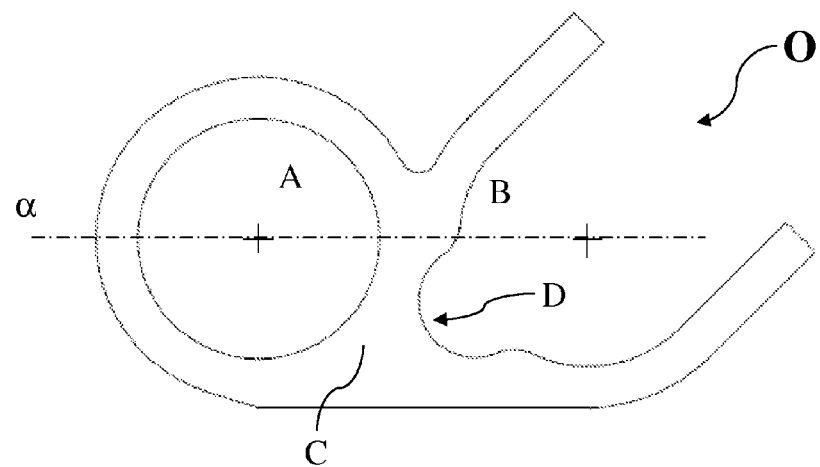
FIG. 6 shows a further variant of the section bar according to the preceding figures comprising a channel inside the second cavity.

In the case of FIG. 4, in which a single lug B3 is present, the insertion direction is nevertheless identified by said lug B3.

The embodiment, shown in FIG. 1, is preferable with respect to the other embodiments as the inclination of the lugs B1, B2 guarantees improved containment of the product that is applied to braze-weld the opposite ends of the lugs following the bending thereof around the tubular conduit 4 and, as will become clear hereunder, after winding/bending the heater 10, to produce a definitive shape.

It is preferable for the section bar 1 to be obtained by extrusion of aluminium or alloys thereof.

One manufacturing method of a fluid flow heater produced with the aforementioned section bar 1 comprises the following steps:

inserting coaxially a resistance wire 2 and an insulating material 3 into the cavity A in order to produce an integrated armoured resistance in the section bar 1, inserting laterally a tubular conduit 4 into the longitudinal cavity B so that the opposite ends of the tubular conduit sufficiently emerge with respect to the opposite ends of the section bar, pressing the heater 10 obtained by means of the preceding steps so as to obtain, preferably simultaneously, the bending of the lugs B1 and B2 around the tubular conduit 4, and pressing the magnesium oxide 3 in the cavity A.

Following said operations the heater 10 thus obtained is shaped/bent to take on a definitive shape, often dependant on the specific use and installation of the heater. Furthermore, a brazing operation can be performed to improve the securing of the tubular conduit to the section bar and to guarantee an improved heat exchange. It is clear that the supply of brazing material is limited to the width of the single groove 5 that forms between the ends of the lugs (or between the single lug B3 and the body of the section bar) after the bending of the lugs (or of the single lug). In addition, said groove being the sole and continuous groove, the filling operation of the groove 5 by means of the filler material is simplified.

To this end, the lugs can be sized so as to not reciprocally overlap each other and so that, when bent around the tubular conduit, they define a slit into which the brazing material can be dosed.

The width of the lugs can be varied in relation to the external diameter of the tubular conduit 4 and to the width of the groove 5 to be obtained.

According to another aspect of the invention, the section bar 1 comprises a flat part C that is functional to the bending/winding of the heater obtained, from the moment that said flat part acts as a resting base on a support component (for example a cylinder) onto which the heater is wound to take on the aforementioned spiral shape or other definitive shape. With reference to the drawings 1 and 3, the approaching plane α of the two cavities A, B cuts the cross-section of the section bar 1 into two parts. The flat part C resulting in the opposite half plane with respect to the opening O of the second cavity B. Using the flat part C as a resting base C for the winding of the heater 10, the groove intended to be brazed is always accessible from the exterior with respect to the shape of the heater, the brazing operation thus being significantly simplified.

According to a preferred variant of the method, the ends of the tubular fluid circulation conduit can be preliminarily machined and bent so as to be arranged for their connection to the hydraulic circuit of a coffee machine. Thanks to the present invention, this operation can be performed before inserting the tubular fluid circulation conduit into the open cavity B, making the manufacturing of the heater 10 extremely simple. It is clear that said preliminary machining would not be possible if both the cavities were closed, i.e. only open at the ends of the section bar, thus resulting in an insertion of the tubular fluid circulation conduit only in a direction that is coaxial to the longitudinal development of the section bar 1.

In order to reduce the mass and thus the thermal inertia of the heater, the thickness of wall relative to the cavity A can be differentiated from the thickness of wall relative to the cavity B.

With particular reference to the drawings 1 and 2, the aforementioned flat part C is adapted to house the safety devices, which are often mandatory for this type of heater. Said flat part C lends itself to fastening by means discharge welding or brazing of the plate usually used as mechanical support for the aforementioned devices. Or, preferably, it can itself be the housing to which said safety devices are fastened by means of elastic clip.

According to another aspect of the invention, the section bar allows tubiform conduits having different diameters to be housed, because the definitive shape of the heater is obtained by means of the bending of the lugs B1 and B2.

Furthermore, the section bar 1 is further arranged to be bent with a greater number of obtainable shapes because the open cavity B offers lesser mechanical resistance than a closed cavity of equal dimensions.

According to a further aspect of the invention, in any one of the variants represented in the drawings at least one channel D can be arranged inside the second cavity B in the portion of wall adjacent to the first cavity A. This channel is particularly useful for injecting a paste or for inserting a wire of filler material, so that a brazing, that improves the transmission of heat between the resistance wire 2 and the tubular fluid circulation conduit 4, can be performed.

The elements and the features illustrated in the different preferred embodiments can be combined with each other without however deviating from the scope of protection of the present application.

The invention claimed is:

1. A section bar for a fluid flow heater, in particular for coffee machines, having a longitudinal development of predefined length, greater than any dimension of a cross-section of the section bar, with two opposite ends, defining a first tubular longitudinal cavity, with openings in said opposite ends, and a second cavity having a lateral opening, which extends along the longitudinal development of the section bar, configured to house a tubular fluid circulation duct by means of insertion in a transversal direction with respect to said longitudinal development, said first and second cavities being placed side by side according to a first plane, (α) said second cavity being U-shaped or J-shaped, said second cavity comprising a single lug oriented such as to define a direction of insertion for said tubular duct or a pair of lugs which are parallel to each other and define a direction of insertion for said tubular duct of fluid circulation, characterised in that said single lug or said pair of lugs have a smaller thickness with respect to a thickness of a perimeter wall defining said first cavity;
   wherein said perimeter wall defining said first cavity includes a cylindrical outer surface extending for more than half of a circumference of said first cavity and defining a continuous uniform thickness of said perimeter wall;
   wherein said first cavity comprises a resistance wire and an insulating material axially inserted;
   wherein said second cavity comprises at least one channel in the portion adjacent to the first cavity, and wherein said at least one channel is adapted for injecting a paste or for injecting a wire of filler material which is brazed in order to improve the transmission of heat between the resistance wire in the first cavity and the tubular fluid circulation duct inserted in the second cavity.

2. The section bar according to claim 1, wherein said direction of insertion is perpendicular or parallel or oblique with respect to said first plane (α).

3. The section bar according to claim 1, wherein, according to a cross-section of the section bar, said single lug or said pair of lugs have an extension such to define a slit when bent about the tubular fluid circulation duct.

4. A fluid circulation heater, in particular for coffee machines, comprising a section bar according to claim 1.

5. The heater according to claim 4, having an encased resistor integrated into the first cavity of the section bar and a tubular fluid circulation duct inserted into the second cavity of the section bar and fixed by means of bending at least one lug about the tubular fluid circulation duct, so that the opposite ends of the tubular fluid circulation duct emerge with respect to the opposite ends of the section bar.

6. A domestic appliance comprising a fluid circulation heater according to claim 4.

7. The section bar according to claim 2, wherein, according to a cross-section of the section bar, said single lug or said pair of lugs have an extension such to define a slit when bent about the tubular fluid circulation duct.

8. The section bar according to claim 2, wherein said second cavity further comprises a channel which is adjacent to the first cavity for the prearrangement of a wire or paste of filler material for the brazing of the section bar and of the tubular fluid circulation duct.

9. The section bar according to claim 3, wherein said second cavity further comprises a channel which is adjacent to the first cavity for the prearrangement of a wire or paste of filler material for the brazing of the section bar and of the tubular fluid circulation duct.

10. A domestic appliance comprising a fluid circulation heater according to claim 5.

11. A method for manufacturing a fluid flow heater, in particular for coffee machines, by means of a section bar according to claim 1, comprising at least the following steps:
   inserting coaxially, with respect to the longitudinal development of the section bar, a resistance wire and a relative insulating material into the first cavity in order to provide an encased resistor integrated in the section bar,
   inserting laterally a tubular duct of fluid circulation into the second cavity so that the opposite ends of the tubular fluid circulation duct emerge sufficiently with respect to the opposite ends of the section bar,
   pressing the heater so as to obtain bending of at least one lug about the tubular fluid circulation duct and pressing the insulating material in the first cavity.

12. The method according to claim 11, further comprising a subsequent operation for shaping/bending/winding the heater in order to adopt a definitive shape, depending on a specific use and installation of the heater.

13. The method according to claim 11, further comprising brazing of the tubular fluid circulation duct and of the section bar by means of a slit obtained in consequence of the bending of at least one lug about the tubular fluid circulation duct in order to improve the fixing thereof and to guarantee better thermal exchange.

14. The method according to claim 11, further comprising a preliminary step of working and/or bending the opposite ends of the tubular fluid circulation duct prior to the lateral insertion thereof into the second cavity of the section bar, so that said opposite ends are prepared for connection to a circuit of a domestic appliance.

15. The method according to claim 12, further comprising brazing of the tubular fluid circulation duct and of the section bar by means of a slit obtained in consequence of the bending of at least one lug about the tubular fluid circulation duct in order to improve the fixing thereof and to guarantee better thermal exchange.

16. The method according to claim 12, further comprising a preliminary step of working and/or bending the opposite ends of the tubular fluid circulation duct prior to the lateral insertion thereof into the second cavity of the section bar, so that said opposite ends are prepared for connection to a circuit of a domestic appliance.

17. The method according to claim 13, further comprising a preliminary step of working and/or bending the opposite ends of the tubular fluid circulation duct prior to the lateral insertion thereof into the second cavity of the section bar, so that said opposite ends are prepared for connection to a circuit of a domestic appliance.

\* \* \* \* \*